(12) United States Patent
Berggren et al.

(10) Patent No.: US 9,712,293 B2
(45) Date of Patent: Jul. 18, 2017

(54) METHOD AND APPARATUS OF COMMUNICATION

(71) Applicant: Huawei Technologies Co., Ltd, Shenzhen (CN)

(72) Inventors: Fredrik Berggren, Väsby (SE); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 13/631,093

(22) Filed: Sep. 28, 2012

(65) Prior Publication Data

US 2013/0022008 A1 Jan. 24, 2013

Related U.S. Application Data

(63) Continuation of application No. PCT/CN2011/072295, filed on Mar. 30, 2011.

(30) Foreign Application Priority Data

Mar. 31, 2010 (SE) ...................................... 1000322
Mar. 31, 2010 (WO) ................. PCT/SE2010/000090

(51) Int. Cl.
*H04W 76/00* (2009.01)
*H04L 5/00* (2006.01)
(Continued)

(52) U.S. Cl.
CPC ............ *H04L 5/001* (2013.01); *H04L 5/0057* (2013.01); *H04W 24/10* (2013.01); *H04W 28/06* (2013.01); *H04W 72/00* (2013.01); *H04W 72/12* (2013.01)

(58) Field of Classification Search
CPC ...... H04W 76/00; H04W 88/08; H04W 72/04
See application file for complete search history.

(56) References Cited

U.S. PATENT DOCUMENTS

| | | | |
|---|---|---|---|
| 7,715,862 B2* | 5/2010 | Riddington | H04W 52/267 370/318 |
| 8,208,936 B2* | 6/2012 | Lindoff et al. | 455/452.1 |

(Continued)

FOREIGN PATENT DOCUMENTS

| | | |
|---|---|---|
| CN | 101615984 A | 12/2009 |
| EP | 2282575 A1 | 2/2011 |

(Continued)

OTHER PUBLICATIONS

International Search Report and Written Opinion received in Patent Cooperation Treaty Application No. PCT/CN2011/072295, mailed Jul. 14, 2011, 6 pages.

(Continued)

*Primary Examiner* — Hassan Phillips
*Assistant Examiner* — Prenell Jones
(74) *Attorney, Agent, or Firm* — Huawei Technologies Co., Ltd.

(57) ABSTRACT

In a radio communication system, a number of downlink component carriers can be aggregated for communication between a network node and a User Equipment (UE). A set of downlink component carriers is determined from the number of downlink component carriers. A downlink control channel for the UE is arranged to include information being usable for identifying at least one downlink component carrier of the set of downlink component carriers. A channel quality report is to be provided for each one of the at least one identified downlink component carrier.

12 Claims, 2 Drawing Sheets

(51) Int. Cl.
*H04W 24/10* (2009.01)
*H04W 28/06* (2009.01)
*H04W 72/00* (2009.01)
*H04W 72/12* (2009.01)

(56) References Cited

U.S. PATENT DOCUMENTS

| | | | | |
|---|---|---|---|---|
| 8,284,709 | B2* | 10/2012 | Youn et al. | 370/315 |
| 8,300,587 | B2* | 10/2012 | Chmiel et al. | 370/329 |
| 2003/0123396 | A1* | 7/2003 | Seo et al. | 370/252 |
| 2005/0128993 | A1 | 6/2005 | Yu et al. | |
| 2007/0195897 | A1 | 8/2007 | Cheng et al. | |
| 2008/0253336 | A1 | 10/2008 | Parkvall et al. | |
| 2008/0280638 | A1* | 11/2008 | Malladi et al. | 455/522 |
| 2009/0175227 | A1* | 7/2009 | Hyounhee | 370/329 |
| 2009/0257356 | A1* | 10/2009 | Frederiksen et al. | 370/252 |
| 2009/0290544 | A1* | 11/2009 | Yano et al. | 370/329 |
| 2009/0303951 | A1* | 12/2009 | Lunttila et al. | 370/329 |
| 2010/0040014 | A1 | 2/2010 | Kang et al. | |
| 2010/0056170 | A1* | 3/2010 | Lindoff et al. | 455/452.1 |
| 2010/0098012 | A1* | 4/2010 | Bala et al. | 370/329 |
| 2010/0165931 | A1* | 7/2010 | Nimbalker et al. | 370/329 |
| 2010/0232382 | A1* | 9/2010 | Gauvreau et al. | 370/329 |
| 2010/0234037 | A1* | 9/2010 | Terry et al. | 455/450 |
| 2010/0238823 | A1* | 9/2010 | Chen et al. | 370/252 |
| 2010/0254329 | A1* | 10/2010 | Pan et al. | 370/329 |
| 2010/0303039 | A1* | 12/2010 | Zhang et al. | 370/331 |
| 2010/0323744 | A1* | 12/2010 | Kim et al. | 455/522 |
| 2011/0002281 | A1* | 1/2011 | Terry et al. | 370/329 |
| 2011/0038310 | A1* | 2/2011 | Chmiel et al. | 370/328 |
| 2011/0076999 | A1* | 3/2011 | Kazmi | H04W 24/10 455/423 |
| 2011/0122794 | A1* | 5/2011 | Kim et al. | 370/252 |
| 2011/0128942 | A1 | 6/2011 | Kim et al. | |
| 2011/0141928 | A1* | 6/2011 | Shin et al. | 370/252 |
| 2011/0205978 | A1* | 8/2011 | Nory | H04L 5/0007 370/329 |
| 2011/0235534 | A1* | 9/2011 | Ratasuk et al. | 370/252 |
| 2011/0242982 | A1* | 10/2011 | Lunttila et al. | 370/241 |
| 2011/0243066 | A1* | 10/2011 | Nayeb Nazar et al. | 370/328 |
| 2011/0243261 | A1* | 10/2011 | Bienas et al. | 375/260 |
| 2011/0268067 | A1* | 11/2011 | Seo | H04B 7/0632 370/329 |
| 2011/0292911 | A1* | 12/2011 | Uemura et al. | 370/331 |
| 2011/0299467 | A1* | 12/2011 | Kim et al. | 370/328 |
| 2011/0317653 | A1* | 12/2011 | Kwon et al. | 370/329 |
| 2012/0002635 | A1* | 1/2012 | Chung et al. | 370/329 |
| 2012/0057487 | A1* | 3/2012 | Ahn et al. | 370/252 |
| 2012/0063302 | A1* | 3/2012 | Damnjanovic et al. | 370/228 |
| 2012/0106450 | A1* | 5/2012 | Golitschek Edler Von Elbwart | H04L 1/003 370/328 |
| 2012/0106491 | A1* | 5/2012 | Yang et al. | 370/329 |
| 2012/0106495 | A1* | 5/2012 | Yang et al. | 370/329 |
| 2012/0106595 | A1* | 5/2012 | Bhattad et al. | 375/146 |
| 2012/0188886 | A1* | 7/2012 | Chen et al. | 370/252 |
| 2012/0269153 | A1* | 10/2012 | Seo et al. | 370/329 |
| 2012/0281527 | A1* | 11/2012 | Sebire et al. | 370/228 |
| 2013/0077585 | A1* | 3/2013 | Pan et al. | 370/329 |
| 2013/0089043 | A1* | 4/2013 | Lunttila et al. | 370/329 |
| 2013/0153298 | A1* | 6/2013 | Pietraski et al. | 175/45 |
| 2013/0235829 | A1* | 9/2013 | Pani et al. | 370/329 |
| 2014/0071946 | A1* | 3/2014 | Terry et al. | 370/331 |
| 2014/0169198 | A1 | 6/2014 | Golitschek Edler Von Elbwart | |
| 2015/0036633 | A1* | 2/2015 | Lunttila et al. | 370/329 |

FOREIGN PATENT DOCUMENTS

| | | |
|---|---|---|
| EP | 2515574 A2 | 10/2012 |
| EP | 2515595 A2 | 10/2012 |
| EP | 2 525 598 A1 | 11/2012 |
| KR | 20120039694 A | 4/2012 |
| RU | 2007125968 A | 1/2009 |
| RU | 2376711 C2 | 12/2009 |
| WO | 2005089000 A1 | 9/2005 |
| WO | 2006073298 A1 | 7/2006 |
| WO | WO 2010/016680 A2 | 2/2010 |
| WO | WO 2010/016698 A2 | 2/2010 |
| WO | WO 2010/105653 A2 | 9/2010 |
| WO | WO 2011/072813 A1 | 6/2011 |
| WO | WO 2011/085230 A2 | 7/2011 |
| WO | WO 2011/116823 A1 | 9/2011 |

OTHER PUBLICATIONS

3$^{rd}$ Generation Partnership Project, "Technical Specification Group Radio Access Network; Evolved Universal Terrestrial Radio Access (E-UTRA); Physical Layer Procedures (Release 9)," 3GPP TS 36.213, v9.1.0, Mar. 2010, 79 pages.

Extended European Search Report received in European Patent Application No. 11762006.2-2412 mailed Dec. 14, 2012, 11 pages.

Panasonic, HTC, "Aperiodic CQI Reporting for Carrier Aggregation," 3GPP TSG-RAN WG1 Meeting 60, R1-101262, San Francisco, California, Feb. 22-26, 2010, 2 pages.

Qualcomm Incorporated, "CQI Feedback for Multicarrier Operation," 3GPP TSG RAN WG1 #60, R1-101478, San Francisco, California, Feb. 22-26, 2010, 4 pages.

Catt, "CQI feedback for LTE-A," 3GPP TSG RAN WG1 Meeting #59bis, R1-100014, Valencia, Spain, Jan. 18-22, 2010, 8 pages.

3GPP TSG RAN WG1 meeting #59 R1-094537,"Analysis of PDCCH monitoring component carrier set on LTE-A", CATT,Nov. 9-13, 2009,total 4 pages.

3GPP TSG RAN WG1 Meeting #60 R1-100954 (R2-100849),"Reply LS on PDCCH monitoring set for carrier aggregation in LTE-Advanced",RAN WG2,Feb. 22-26, 2010,total 1 pages.

3GPP TSG RAN WG1 Meeting #60 R1-100878,"CQI feedback for LTE-A",CATT,Feb. 22-26, 2010,total 7 pages.

3GPP TSG-RAN WG2 Meeting #68bis R2-100280,"Analysis on carrier activation and de-activation",New Postcom, Jan. 18-22, 2010,total 4 pages.

3GPP TSG RAN WG2 #69 R2-101119,"DL carrier activation/deactivation by MAC",ETRI,Feb. 22-26, 2010,total 4 pages.

3GPP TSG-RAN2 Meeting #69 R2-101492,"CC Activation/Deactivation Details",LG Electronics Inc.,Feb. 22-26, total 2 pages.

3GPP TSG-RAN WG2 #68bis Tdoc R2-100079,"Summary of the email discussion [68#23] LTE: CC activation / deactivation",Ericsson, ST-Ericsson, Jan. 18-22, 2010,total 17 pages.

3GPP TSG RAN WG1 #58bis R1-094207,"CQI Feedback for Multicarrier Operation", Qualcomm Europe, Oct. 12-16, 2009, total 5 pages.

3GPP TSG-RAN WG1 Meeting 59bis R1-100372,"Apeeiodic CQI Reporting for Carrier Aggregation",Panasonic et al., Jan. 18-22,total 2 pages.

3GPP TSG RAN WG1 #59bis R1-100676,"CQI Feedback for Multicarrier Operation",Qualcomm Incorporated, Jan. 18-22, 2010,total 4 pages.

3GPP TS 36.211 V9.1.0,3rd Generation Partnership Project;Technical Specification Group Radio Access Network; Evolved Universal Terrestrial Radio Access (E-UTRA);Physical Channels and Modulation(Release 9),Mar. 2010,total 85 pages.

3GPP TS 36.300 V9.2.0,3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2(Release 9),Dec. 2009,total 178 pages.

3GPP TS 36.321 V9.1.0,3rd Generation Partnership Project;Technical Specification Group Radio Access Network; Evolved Universal Terrestrial Radio Access (E-UTRA)Medium Access Control (MAC) protocol specification(Release 9),Dec. 2009,total 48 pages.

* cited by examiner

METHOD AND APPARATUS OF COMMUNICATION

This application is a continuation of International Application No. PCT/CN2011/072295, filed Mar. 30, 2011, which claims priority to International Application No. PCT/SE2010/000090, filed Mar. 31, 2010, and Swedish Patent Application No. 1000322-6, filed Mar. 31, 2010, all of which applications are incorporated herein by reference.

TECHNICAL FIELD

The invention relates to wireless communication technologies, especially relates to method and apparatus of aperiodic downlink channel quality reporting in a radio communication system utilizing carrier aggregation.

BACKGROUND

In contemporary radio communication systems, including cellular systems, such as e.g., $3^{rd}$ Generation Partnership Project (3GPP) Long Term Evolution (LTE) systems, the transmission format used is adapted to the existing radio environment in order to maximize the spectral efficiency. Such adaptation encompasses the modulation level and channel coding rate. The adaption may also include adjustment of Multiple-Input and Multiple-Output (MIMO) related formats, e.g., adaption of used precoder matrix, rank of data transmission, or the like.

In order for a node in the radio communication system, such as a base station/eNode-B (eNB), to be able to perform adaptation for its downlink transmissions, usually some feedback relating to the downlink channel information is transmitted from the mobile/User Equipment (UE). In LTE systems, implicit measures are used for this feedback, e.g., the UE may report a Channel Quality Indicator (CQI) value to indicate suitable modulation and coding format to be used, as well as Precoding Matrix Indicators (PMIs) and Channel Rank Indicator (RI) on the uplink channel.

In 3GPP LTE, the transmission of CQI/PMI/RI reports can be either periodic or aperiodic. Periodic reports are transmitted in the Physical Uplink Control Channel (PUCCH). These periodic reports are transmitted on resources being configured by the eNB, wherein the eNB also configures the periodicity of the reports.

The aperiodic reports can referred to as triggered reports, or scheduled reports, and can contain more information than the periodic reports. Such information can include e.g., the CQI, PMI and RI, and is scheduled by the eNB via an uplink grant (UL grant) in the Physical Downlink Control Channel (PDCCH). The information is transmitted in the Physical Uplink Shared Channel (PUSCH). Also, since simultaneous transmission of PUCCH and PUSCH is not allowed in LTE, the periodic report is multiplexed into the PUSCH, if there is a collision with UL data transmission.

In 3GPP LTE-Advanced systems, carrier aggregation can be used, which implies that a UE simultaneously can receive and transmit on more than one downlink (DL) and uplink (UL) component carrier, respectively. If one UE is scheduled to transmit data on multiple DL component carriers, there will be one PDCCH corresponding to each scheduled downlink component carrier. Correspondingly, if one UE is scheduled to transmit data on multiple UL component carriers, there will be one PDCCH corresponding to each scheduled uplink component carrier.

When using carrier aggregation in LTE-Advanced, at most five downlink component carriers, and/or at most five uplink component carriers can be aggregated. The carrier aggregation can be asymmetric, i.e., a UE may have more downlink component carriers than uplink component carriers.

An LTE-Advanced UE can utilize a number of component carriers for carrier aggregation, where these carriers are configured by the Radio Resource Control (RRC) signalling by the eNB, i.e., the carrier aggregation used can be UE-specific. Also, the eNB may among the number of configured downlink component carriers deactivate some of these downlink carriers. For such a deactivated downlink component carrier, the UE is neither monitoring the PDCCH, nor receiving the Physical Downlink Shared Channel (PDSCH). The UE does also not report any CQI/PMI/RI for this deactivated downlink component carrier. Carrier activation/deactivation is here facilitated by Media Access Control (MAC) signalling, which can be performed faster than the carrier configuration/reconfiguration handled by RRC signalling.

It is also considered in prior art to define a PDCCH monitoring set, i.e., a subset of the active component carriers for which the UE is monitoring the PDCCH. The use of such a monitoring set may ease the processing burden of the UE, which otherwise blindly has to search for the PDCCH in its search spaces. Generally, a UE in the system searches for the PDCCH in two search spaces; a common search space and a UE-specific search space. These search spaces are comprised by a number of control channel elements defining positions in the time-frequency domain, on which the PDCCH can be transmitted. The location of the PDCCH is not known by the UE, and the UE therefore blindly has to search several possible candidate positions in such search spaces.

Furthermore, LTE-Advanced supports cross-carrier scheduling, i.e., the PDCCH of a downlink component carrier can assign PDSCH or PUSCH transmission resources in one of multiple downlink component carriers and uplink component carriers, respectively, by utilizing the carrier indicator field (CIF) in the PDCCH. In LTE-Advanced, the configuration of the presence or non-presence of CIF bits in the PDCCH is semi-static and UE specific. Thus, the configuration of the CIF bits is not system-specific or cell-specific. Also, these CIF bits do not have to be configured for all downlink component carriers.

When used, the CIF bits have a length being equal to 3 bits. The CIF bits define a number of CIF states. Each CIF state is here associated with one of the aggregated component carriers. The CIF in the DL scheduling PDCCH indicates that one PDSCH is scheduled on the active downlink component carrier corresponding to the state indicated by the CIF. However, the CIF in the UL grant PDCCH indicates that one PUSCH will be scheduled on the active uplink component carrier corresponding to the state indicated by the CIF.

A number of different Downlink Control Information (DCI) formats can be transmitted on the PDCCH for different purposes. The PUSCH, which can include UL data and/or CQI/PMI/RI reports, is scheduled through DCI Format 0.

For cross-carrier scheduling, explicit CIF indications are included at least for DCI formats 0, 1, 1A, 1B, 1D, 2, 2A, 2B in the UE-specific search space. CIF bits are not included in Format 0 scheduled in the common search space. However, CIF bits may be included in new LTE-Advanced formats, e.g., those that are needed for supporting UL MIMO or enhanced DL MIMO.

In 3GPP LTE, a UE searches for DCI Format 0 and 1A simultaneously. In order to simplify the decoding effort, the payload sizes of Format 0 and 1A are matched to be of the same length. So called padding bits are appended to the information fields in these formats to assure that the number of bits are the same. That is, if the number of information bits in Format 0 is smaller than in Format 1A, zeros are padded until the total number of bits is the same as the number of information bits of Format 1A, or vice versa.

The periodic CQI/PMI/RI reports are in LTE-Advanced transmitted on a single UE-specific uplink component carrier. This specific uplink component carrier may be referred to as primary component carrier (PCC), or anchor carrier. Other component carriers, i.e., non-PCCs, may be referred to as secondary component carriers (SCCs). Generally, it can be assumed that several UEs in a cell are configured for carrier aggregation. However, most of the time, usage of one component carrier might be sufficient for each UE. Thus, most of the time only a few UEs in a cell may need to use multiple active carriers for their PDSCH/PUSCH transmission. That is, it can be expected that, most of the time, a UE confines its PDSCH/PUSCH transmissions to the PCC.

In LTE, an aperiodic CQI/PMI/RI report is enabled by a CQI request bit in Format 0 of the UL grant PDCCH. It is possible to concurrently send the aperiodic CQI/PMI/RI report with other data and if the UL grant also schedules UL data, the CQI/PMI/RI report is punctured into the PUSCH. The information being present in the report depends on the transmission mode and the CQI reporting mode.

LTE does not support carrier aggregation, and consequently the report contains CQI/PMI/RI information relating to the only DL carrier used for the UE. Also, the report is transmitted on the PUSCH of the only UL carrier used for the UE (for FDD). In case the aperiodic report would collide with the transmission of a periodic report, the periodic report is dropped. Aperiodic CQI/PMI/RI report can also be requested through a random access response grant, which contains one CQI request bit.

However, since carrier aggregation utilizes more than one component carrier when carrier aggregation is configured for a UE, e.g., in an LTE-Advanced system, aperiodic feedback, such as channel quality reports, for multiple active downlink component carriers cannot be performed by utilizing the known prior art solutions. Also, the prior art solutions for transmission of such aperiodic feedback on the PUSCH do not work for systems using carrier aggregation, for example if the number of downlink component carriers is greater than the number of uplink component carriers. Thus, if directly applying prior art solutions on such a carrier aggregation system, the channel quality reports would not reliably reach the network node requesting the reports.

Also, aperiodic channel quality reports need to be scheduled, which requires signalling. If prior art scheduling solutions would be directly applied to a carrier aggregation system, it would result in a substantive amount of overhead being associated with this scheduling.

Thus, the prior art fails to provide a low overhead solution for aperiodic downlink channel quality reporting for a system utilizing carrier aggregation.

SUMMARY OF THE INVENTION

In one aspect, the present invention provides an aperiodic channel quality reporting for a system utilizing carrier aggregation that solves the above stated problem.

A specific embodiment of the above mentioned method of aperiodic downlink channel quality reporting, will be described now. A set of downlink component carriers is determined from the number of downlink component carriers. A downlink control channel for the UE is arranged to include information being usable for identifying at least one downlink component carrier of the set of downlink component carriers. A channel quality report is to be provided for each one of the at least one identified downlink component carrier.

In another embodiment, a network node includes a set determination entity that is arranged for determining a set of downlink component carriers from the number of downlink component carriers. A downlink control channel providing entity being arranged for providing a downlink control channel for the UE. The downlink control channel is arranged to include information being usable for identifying at least one downlink component carrier of the set of downlink component carriers for which a channel quality report is to be provided.

In another embodiment, a UE comprises a channel quality reporting entity that is arranged for providing a channel quality report for each one of at least one identified downlink component carrier. The at least one identified downlink component carrier is identified from a set of downlink component carriers by utilizing information being included in a downlink control channel for the UE.

The invention also relates to a computer program and a computer program product, respectively, implementing the method of the claim.

Thus, the method for aperiodic channel quality reporting, the network node, and the UE of the invention are characterized in that one or more carrier aggregation downlink component carriers for which channel quality reports are to be transmitted, respectively, are identifiable by a UE utilizing information being provided to it by the network node on the downlink control channel. The UE can then provide channel quality reports for those thereby identified one or more downlink component carriers.

Hereby, an aperiodic channel quality reporting is obtained, which works well in a radio communication system, such as LTE-Advanced, which utilizes carrier aggregation.

Also, the aperiodic channel quality reporting according to the invention adds very little to the system complexity and overall overhead, since existing control channel resources are reused to a large extent for the transmission of the information identifying the downlink component carriers, for which channel quality reports are requested.

According to an embodiment of the invention, Carrier Indicator Field (CIF) bits of the downlink control channel are used for directly or indirectly pointing out downlink component carriers for which a channel quality report is requested. Since the CIF bits are already defined and present in the downlink control channel, this embodiment reduces the system overhead.

According to an embodiment of the invention, the information being provided in the downlink control channel to the UE is comprised of jointly encoded information. This jointly encoded information can include information being usable for identifying combinations of one or more downlink component carrier for which a channel quality report is to be provided, and an uplink component carrier to be used for uplink transmission of the channel quality reports, respectively. This embodiment results in a very efficient encoding of this information, and has low complexity and low system overhead. Furthermore, the joint encoding results in flexibility for operation of the system, since aperiodic reporting for any downlink component carrier is allowed as well as selection of uplink component carrier to be used for transmission.

According to an embodiment of the invention, at least one uplink component carrier is identified based on the information provided by the downlink control channel. This identified uplink component carrier is then used for uplink transmission of the at least one channel quality report being requested. By this embodiment, the uplink transmission of the channel quality reports can be optimized regarding e.g., transmission resources, signaling and the like in the system.

Detailed exemplary embodiments and advantages of the aperiodic channel quality reporting according to the invention will now be described with reference to the appended drawings illustrating some preferred embodiments.

DETAILED DESCRIPTION OF ILLUSTRATIVE EMBODIMENTS

In a radio communication system utilizing carrier aggregation, such as e.g., an LTE-Advanced system, carrier aggregation is in the downlink achieved by aggregating downlink component carriers. Correspondingly, carrier aggregation in the uplink is achieved by aggregating uplink component carriers. Then, communication between a network node, such as a base station/eNB, and a UE, being essentially any portable entity being able to communicate with the network node, can utilize a number of component carriers.

For aperiodic downlink channel quality reporting to be performed in such a system, scheduling has to be performed, and preferably in a way that does not add to, or at least does not add more than absolutely necessary to the signalling overhead in the system.

Here, and in this entire document, the terms channel quality reporting and channel quality report are defined to include essentially any type of information being related to the state, performance or quality of a channel, i.e., including Channel State Information (CSI), such as e.g., CQI, PMI, or RI.

According to embodiments of the invention a set of downlink component carriers is determined from the number of downlink component carriers. Also, information is included in the downlink control channel for the UE. This information can by the UE be used for identifying one or more downlink component carriers in the determined set of downlink component carriers as being one or more downlink component carriers for which a channel quality report is wanted by the network node. Thus, the UE can, when this information is detected, determine for which downlink component carriers it should provide a channel quality report to the network node. The UE is then arranged for providing a channel quality report for each one of the one or more identified downlink component carrier to the network node.

Embodiments of the invention make it possible to achieve aperiodic downlink channel quality reporting in a system utilizing carrier aggregation. It is thus possible to get channel quality reports for one or more of any number of downlink component carriers being used for the carrier aggregation of the communication between the network node and the UE.

The downlink component carriers for which a channel quality report should be provided are chosen from a set of downlink component carriers.

According to an embodiment of the invention, this set of downlink component carriers includes all active component carriers of the number of downlink component carriers being usable for the carrier aggregation.

According to an embodiment of the invention, a subset of all active component carriers of the number of downlink component carriers being usable for the carrier aggregation is selected for this set of downlink component carriers.

According to these embodiments of the invention, channel quality reporting is only requested active component carriers of the carrier aggregation. Thus, no transmission resources and no computation resources are here wasted on component carriers having been deactivated by the network node, which reduces transmission, signalling, and computation overhead.

According to an embodiment of the invention, the set of downlink component carriers is known, from, e.g., earlier signaling or initial setup parameters, by the both network node and the UE. Thus, the UE here knows which downlink component carriers that are included in the set.

According to another embodiment of the invention, the UE does initially not know the set, i.e., the UE does not know which downlink component carriers are included in the set. Here, information identifying the set of downlink component carriers is signaled by the network node to the UE. Thus, after having received this information from the network node, the UE also knows which downlink component carriers are part or the set.

When carrier aggregation is used, enabling of aperiodic channel quality reports, such as CQI/PMI/RI reports, is needed for one or more active downlink component carriers. UL transmission of such aperiodic channel quality reports must also be scheduled in the UL. Aperiodic reporting may become a problem in a number of cases. One problematic case occurs if the UE does not monitor the DL control channels of all active downlink component carriers. One other problematic case occurs if the UE has more active DL component carriers than UL component carriers. Another problematic case occurs if at least one active downlink component carrier is not linked with an uplink component carrier.

In the prior art 3GPP LTE system, the aperiodic CQI/PMI/RI report is scheduled by a PDCCH being located on the same downlink carrier for which the aperiodic CQI/PMI/RI report is to be requested. Thus, a CQI/PMI/RI report for a specific downlink carrier is scheduled by a PDCCH on that same specific downlink carrier. Hence, the prior art solutions do not solve the above stated problems, e.g., it is in the prior art solution not possible to provide reports on a component carrier where the PDCCH is not monitored.

According to the invention, these problems are solved by including information in the downlink control channel for the UE of a specific downlink component carrier, which information can be used for identifying one or more downlink component carriers for which a channel quality report is to be provided. These one or more downlink component carriers are in this document denoted identified downlink component carriers, and may or may not include the specific downlink component carrier on which the information was included. These embodiments will be described below.

According to an embodiment of the invention, the information being provided by the downlink control channel has characteristics which make it possible for the UE to directly identify the one or more identified downlink component carrier for which channel quality reports should be provided to the network node. Thus, the information directly points out for which downlink component carriers a channel quality report is requested, which reduces the computation complexity of the UEs in the system, since the UE here detects the information and thereby immediately knows for which downlink component carriers it should provide a channel quality report.

According to an embodiment of the invention, an enumeration of the downlink component carriers is here used for the direct identification of the downlink component carriers for which reports are to be sent. Thus, the information in the downlink control channel indicates an enumeration corresponding to the one or more identified downlink component carriers. The UE can here detect one or more enumerations for one or more downlink component carriers. These enumerations are by the UE utilized for directly identifying downlink component carriers for which channel quality reports are to be transmitted. For example, at least one indicated downlink component carrier can have an enumeration being equal to an enumeration of at least one uplink component carrier.

Further, according to another embodiment of the invention, the information in the downlink control channel is instead used for indirect identification of the one or more downlink component carriers for which a channel quality report is to be provided to the network node by the UE. By this, downlink component carriers not being identified by the direct identification method can be indicated by the information such that a channel quality report request also for those downlink component carriers can be obtained.

According to an embodiment of the invention, this indirect identification utilizes a predefined association between uplink component carriers and downlink component carriers. For instance, one non-limiting example of such a predefined association to be used is the frequency duplex distance between an uplink component carrier and a downlink component carrier. Then, the information in the downlink control channel points out one or more uplink component carriers, which each in turn, by the association, points out a downlink component carrier, for which a channel quality report is to be provided. To associate the downlink component carriers to the well-defined uplink component carriers has an advantage in that signaling already defined in the system can be utilized for this identification without increasing system complexity. For example, UL transmission of the channel quality reports is in the system scheduled by a grant transmitted in the downlink control channel. Such a grant can be utilized for this purpose. This will also be described more in detail below.

Thus, by utilizing these embodiments for direct and indirect identification of downlink component carriers of the invention, one or more downlink component carriers, possibly including both the specific downlink component carrier including the downlink control channel and other downlink component carriers, are pointed out (identified) such that channel quality reports can be provided for those thereby identified downlink component carriers. Here, the identified downlink component carriers may include one or more downlink component carriers not being monitored by the UE. Thus, aperiodic CQI/PMI/RI reports can, by utilizing these embodiments of the invention, be provided for active downlink component carriers for which the UE may not monitor the downlink control channel, e.g., for downlink component carriers that are not included in a PDCCH monitoring set, for component carriers that are cross-scheduled, or for component carriers that are not linked.

The UE is here arranged for detecting the information on the downlink control channel and for utilizing this information for determining for which identified downlink control channels a channel quality report is to be provided. As described above, according to an embodiment of the invention, this information is by the UE detected and utilized for directly or indirectly identifying the one or more identified downlink component carriers. Thus, the UE is here arranged for performing such direct and indirect identification, respectively.

Further, according to an embodiment of the invention, the identification of the at least one downlink component carrier for which a channel quality report is to be provided is a combination of direct and indirect identification. Thus, for some of the downlink component carriers the information on the downlink control channel is utilized for directly identifying those downlink component carriers, and for some other downlink component carriers the information on the downlink control channel is utilized for indirectly identifying those downlink component carriers. The UE is arranged for performing such a combined/mixed identification.

Further, according to an embodiment of the invention, the information in the downlink control channel, being used for identifying downlink component carriers for which a channel quality report is to be provided, is represented by one or more bits being transmitted in the downlink control channel.

Generally, since the aperiodic reports are scheduled, it is desirable to reduce the overhead associated with transmitting multiple downlink control channels each comprising a CQI report request for different component carriers.

According to an embodiment, these one or more bits include Carrier Indicator Field (CIF) bits. Thus, CIF bits of the downlink control channel are here used for directly or indirectly pointing out downlink component carriers. The principles of these direct and indirect identifications of downlink component carriers will hereafter be exemplified for the embodiment utilizing the CIF bits. The use of the CIF bits reduces the overhead, since the CIF bits are already defined and present in the downlink control channel. This is explained more in detail in the following.

Generally, UEs can be configured for cross-carrier scheduling. This is enabled by the specific CIF field in the downlink control channel. The CIF bits are in the system defined to in an UL grant assign resources to be used for data transmission in the uplink shared data channel, e.g., PUSCH. For downlink assignment, the CIF bits are in the system defined to assign resources to be used for the downlink data channel PDSCH. As stated above, according to a number of embodiments of the invention, the CIF bits in an UL grant serve the additional purpose of pointing out DL component carriers for which aperiodic CQI/PMI/RI should be reported.

That is, for if there is positive CQI request present, the CIF bits in the UL grant are used to determine the DL component carrier(s) for which the CQI/PMI/RI report(s) should be provided.

Specifically, if CIF bits exist in the downlink control channel and a CQI report is requested, i.e., for LTE-Advanced, a CQI request bit is positive, then aperiodic CQI/

PMI/RI report(s) should be reported for the DL component carrier determined according to an interpretation of the CIF bits.

Hence, by this, aperiodic CQI/PMI/RI reports for active DL component carriers for which the UE is not monitoring the downlink control channel can be provided, which is very important in a system using carrier aggregation.

The interpretation of the CIF bits may point out a downlink component carrier for which aperiodic CQI/PMI/RI reporting is to be provided by directly pointing out a DL component carrier. For example, in a direct interpretation (direct identification), a CIF value, being '000', could imply that aperiodic CQI/PMI/RI reports should be reported for the downlink component carrier enumerated by '000'. The direct interpretation is beneficial, since it enables the UE to identify any downlink component carrier for the purpose of aperiodic channel quality reporting.

Figure 1:
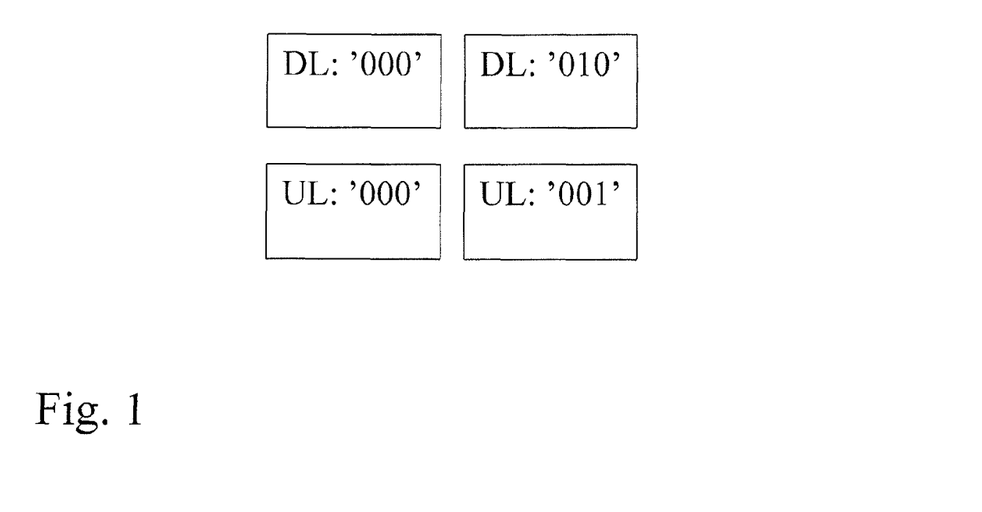
FIG. 1 shows an example of a downlink and uplink component carrier configuration.

Also, the interpretation of the CIF bits may point out a downlink component carrier for which aperiodic CQI/PMI/RI reporting is to be provided by indirectly pointing out a downlink component carrier through a relation, i.e., an association, to an uplink component carrier. For example, a CIF value being '000', could here imply that aperiodic CQI/PMI/RI should be reported for the downlink component carrier which is paired with the uplink component carrier being enumerated by '000', as is illustrated in FIG. 1. The indirect interpretation is beneficial if the paired uplink and downlink component carriers have different enumeration, since the eNB can then schedule transmission of aperiodic channel quality reports in any suitable uplink component carrier.

FIG. 1 shows a case, where two downlink component carriers enumerated by '000' and '010' are used for downlink carrier aggregation, while two uplink component carriers enumerated by '000' and '001' are used for uplink carrier aggregation. Here downlink component carrier '000' is paired with uplink component carrier '000', and downlink component carrier '010' is paired with uplink component carrier '001'.

According to an example, a positive CQI request is present and an uplink grant PDCCH is scheduled in the downlink component carrier '000'. Also, the PDCCH contains CIF bits '001'. Then, according to an embodiment of the invention, this is by the UE interpreted as a request for reporting of aperiodic CQI/PMI/RI for the downlink component carrier being paired with the uplink component carrier being indicated by the CIF bits. Thus, the CIF bits here indicates that a channel quality report should be sent for the downlink component carrier '010', which is paired with the uplink component carrier '001'.

Also, the CIF bits '001' indicate, as usual, that the corresponding data should be scheduled in the PUSCH of the uplink component carrier '001'. Thus, the CIF bits '001' simultaneously requests aperiodic CQI/PMI/RI reports for the paired downlink component carrier '010' and schedules uplink transmission in the uplink component carrier enumerated '001'.

In the example illustrated in FIG. 1, there is no uplink component carrier being enumerated by '010' which implies that it would not be possible to use direct interpretation of CIF for providing aperiodic CQI/PMI/RI reports for the downlink component carrier '010' and simultaneously schedule transmission of uplink data, by CIFs having the value '010'. This problem is thus solved by using the indirect relation (association) of CIF bits via an uplink component carrier.

Moreover, the CIF bits may be used for explicitly pointing out downlink component carriers, i.e., the CIF bits are used as they are when being detected by the UE. The CIF bits may also be used for implicitly pointing out downlink component carriers, i.e. the CIF bits are detected by the UE are then processed before being used, e.g., by first utilizing some appropriate function or rule on the CIF bits, that is predefined or signaled to the UE.

Further, according to an embodiment of the invention, the information in the downlink control channel includes a positive channel quality report request. Thus, the information includes a bit being set to have a value of '1', which indicates that a channel quality report is requested.

According to an embodiment of the invention, the positive channel quality report request indicates that channel quality reports are requested for all downlink component carriers of a set of downlink component carriers. The set can here include either all active downlink component carriers being used for the downlink carrier aggregation, or a subset of all active downlink component carriers being used for the downlink carrier aggregation. Thus, a UE detecting this positive channel quality report request includes all downlink component carriers of that set of downlink component carriers to the identified downlink component carriers, for which channel quality reporting is to be provided.

According to an embodiment of the invention, the information in the downlink control channel also includes at least one Carrier Indicator Field (CIF) bit. This at least one CIF bit is then by a UE to be interpreted as identifying at least one uplink component carrier to be used for uplink transmission of the one or more channel quality reports, respectively. Thus, when the UE detects information in the downlink control channel including both a positive channel quality report request and one or more CIF bits, it provides such reports for all, or a subset of all, active downlink component carriers, and provides these reports to the network node on uplink component carriers also being identified by the information.

Also, according to an embodiment of the invention, the one or more uplink component carrier to be used for uplink transmission of the one or more channel quality reports are instead by the UE identified by their association to one or more downlink component carrier, respectively. Here, no CIF bits are needed to be provided for identifying the uplink transmission resources.

If no CIF bits are needed for identifying uplink component carriers, they can instead be used for identifying downlink component carriers. Here, the interpretation of the CIF bits for aperiodic CQI/PMI/RI reports is given, i.e., the interpretation is either known by both the network node and the UE, or is signaled by the network node to the UE. A UE which is configured with cross-carrier scheduling, will have knowledge of a mapping from the values of the CIF to an entity, from which a carrier can be uniquely addressed. For example, in LTE the E-UTRA Absolute Radio Frequency Number (EARFCN) can be used to obtain the carrier center frequency. The enumeration of component carriers may be different in the uplink and the downlink, and may be different depending on which downlink component carrier the PDCCH was included in.

A CIF field having a length of n bits corresponds to $2^n$ states. A number of these states could be utilized to indicate channel quality report requests for more than one downlink component carrier. In LTE-Advanced, the CIF field is 3 bits long, which can correspond to 8 states. Since at most five component carriers could be aggregated in LTE-Advanced, there may be spare states.

Thus, according to an embodiment, five of these states each corresponds to a channel quality report request for a single downlink component carrier, while the three remaining states corresponds to a channel quality report request for multiple downlink component carriers. For these remaining states, one single PDCCH grant can request CQI/PMI/RI reports for multiple component carriers, which reduces the system overhead and complexity.

As stated above, according to an embodiment, one such spare state corresponds to channel quality request report for all active DL component carriers.

According to another embodiment, another spare state represents a CQI request for the PCC and possibly at least one more downlink component carrier.

According to an embodiment of the invention, one spare state denotes the PCC and the downlink component carrier being closest located above (or below) in frequency in relation to the PCC. If the PCC has the highest (or lowest) carrier frequency of all active DL component carriers, any form of cyclic enumeration could be used for identifying the further one or more downlink component carriers, for which a CQI report is to be requested. The rules for interpreting these spare states are either predefined, i.e., known by both the network node and the UE, or is to be configured, i.e., need to be signaled to each UE from the network node.

According to an embodiment of the invention, when spare states of the CIF field are used, according to the above embodiments, for triggering CQI/PMI/RI requests for all the downlink component carriers, or for at least two downlink component carriers, then also one uplink component carrier to be used for transmission of those reports to the network node will be predefined according to a certain rule for such reports. For example, an anchor carrier, or the uplink carrier being linked to the downlink carrier on which the downlink control channel is transmitted will is predefined to provide the reports to the network node.

According to an embodiment of the invention, when the positive channel quality report request is included in a downlink control channel of a PCC, and CIF bits are available but unused for identification of downlink component carriers, i.e., the CIF bits are ignored for downlink component carrier identification purpose, the positive channel quality report request shall be interpreted as a channel quality report request for the PCC carrying the downlink control channel.

According to another embodiment, when the positive channel quality report request is included in a downlink control channel of a PCC, and CIF bits are available but unused for identification of downlink component carriers, the positive channel quality report request shall be interpreted as a channel quality report request for that PCC and all SCCs of the set of downlink component carriers, i.e., of all or a subset of the active downlink component carriers.

Further, according to an embodiment of the invention, when the positive channel quality report request is included in a downlink control channel of a PCC, and CIF bits are unavailable, the positive channel quality report request shall be interpreted as a channel quality report request for the PCC carrying the downlink control channel.

According to another embodiment, when the positive channel quality report request is included in a downlink control channel of a PCC, and CIF bits are unavailable, the positive channel quality report request shall be interpreted as a channel quality report request for that PCC and all SCCs of the set of downlink component carriers.

In the above embodiments, in which the positive channel quality report request is included in the PCC control channel, the control channel may be transmitted in the common search space of the PCC.

According to an embodiment of the invention, the positive channel quality report request is included in a downlink control channel of a SCC, wherein CIF bits are available, but are unused for identification of downlink component carriers. Thus, the CIF bits are here ignored for downlink component carrier identification purposes. Then, the positive channel quality report request is to be interpreted as a channel quality report request for that SSC. The downlink control channel can here be transmitted in a common search space of the SCC.

According to another embodiment, wherein CIF bits are available but unused for identification of downlink component carriers, the positive channel quality report request is to be interpreted as a channel quality report request for that SCC and for the PCC of the set of downlink component carriers, including all or a subset of the active downlink component carriers.

According to another embodiment, wherein CIF bits are available but unused for identification of downlink component carriers, the positive channel quality report request is to be interpreted as a channel quality report request for all SCCs of the set, i.e., of all or a subset of the active downlink component carriers.

According to another embodiment, wherein CIF bits are available but unused for identification of downlink component carriers, the positive channel quality report request is to be interpreted as a channel quality report request for all SCCs and the PCC of the set of downlink component carriers, i.e., for all downlink component carriers of that set.

According to another embodiment, wherein CIF bits are available but unused for identification of downlink component carriers, the positive channel quality report request is to be interpreted as a channel quality report request for the PCC and a component carrier being closest above in frequency in relation to that PCC in the set of downlink component carriers.

According to another embodiment, wherein CIF bits are available but unused for identification of downlink component carriers, the positive channel quality report request is to be interpreted as a channel quality report request for the PCC and a component carrier being closest below in frequency in relation to the PCC in the set of downlink component carriers.

However, if there are no CIF bits available for pointing out the DL component carrier for which the CQI/PMI/RI report applies, e.g., if it is not possible to configure a UE with a cross-carrier scheduling, then the downlink control channel can only be transmitted in any of the downlink component carriers which the UE is monitoring.

According to an embodiment of the invention, this problem is solved by utilizing a predetermined rule for establishing the relation between which downlink component carriers to provide CQI/PMI/RI reports for, and the downlink component carrier being used for transmitting the downlink control channel with the positive CQI request. In the following, embodiments corresponding to the embodiments above, in which CIF bits were included in the downlink control channel, are presented for the situation where the UE is not possible to configure for cross-scheduling, i.e., for the situation where there are no CIF bits available.

According to an embodiment of the invention, when the positive channel quality report request is included in a downlink control channel of a SCC, wherein CIF bits are unavailable, the positive channel quality report request is to be interpreted as a channel quality report request for that SSC. The downlink control channel can here be transmitted in a common search space of the SCC.

According to another embodiment, wherein CIF bits are unavailable, the positive channel quality report request is a channel quality report request for that SCC and for the PCC of the set of downlink component carriers.

According to another embodiment, wherein CIF bits are unavailable, the positive channel quality report request is to be interpreted as a channel quality report request for all SCCs of the set.

According to another embodiment, wherein CIF bits are unavailable, the positive channel quality report request is to be interpreted as a channel quality report request for all SCCs and the PCC of the set, i.e., for all active downlink component carriers.

According to another embodiment, wherein CIF bits are unavailable, the positive channel quality report request is to be interpreted as a channel quality report request for the PCC and a component carrier being closest above in frequency in relation to that PCC in the set of downlink component carriers.

According to another embodiment, wherein CIF bits are unavailable, the positive channel quality report request is to be interpreted as a channel quality report request for the PCC and a component carrier being closest below in frequency in relation to the PCC in the set of downlink component carriers.

In all the above embodiments, one single PDCCH grant can request a CQI/PMI/RI report for each one of multiple downlink component carriers. This reduces computational and signaling overhead.

Also, in the above embodiments, in which the positive channel quality report request is included in the SCC control channel, the control channel may be transmitted in the common search space of the SCC.

Thus, as stated above, according to different embodiments of the invention, the PDCCH is transmitted in the common search space of either the PCC or an SCC. In this case, DCI Format 0 does not contain any CIF bits. The transmission of the aperiodic report is then confined to be in an UL component carrier being linked to the DL component carrier that contained the PDCCH. As stated above, the aperiodic report can then be provided for either the DL component carrier that contained the PDCCH or, be provided for the PCC and all SCCs.

Further, as stated above, according to different embodiments of the invention, the methods described in the above embodiment are applied also if there are CIF bits in the associated PDCCH. For this embodiment, the CIF bits are transmitted in the PDCCH but are not used for identifying the DL component carrier for which the aperiodic report should be given. Also, the CIF bits may not need to be used for determining the UL component carrier to be used for transmission, which could be pre-defined by some association to the DL component carrier. Hence, the above embodiments could be transparent to if a UE is configured for cross-carrier scheduling, which simplifies the receiver, i.e., lower UE complexity.

Further, in radio communication system, such as LTE-Advanced, there is always a need for reducing the system complexity and making the signaling efficient.

According to an embodiment of the invention, in order to achieve low complexity and high efficiency, the information being provided in the downlink control channel is comprised of jointly encoded information.

According to an embodiment of the invention, this jointly encoded information includes information being usable for identifying combinations of one or more downlink component carrier for which a channel quality report is to be provided, i.e., one or more identified downlink component carrier, and an uplink component carrier to be used for uplink transmission of the thus provided channel quality reports, respectively.

Therefore, when a UE detects such jointly encoded information, the UE immediately knows for which downlink component carriers it shall provide channel quality reports, and also on which uplink component carriers these report should be transmitted to the network node. This embodiment results a very efficient encoding of this information. Furthermore, the joint encoding results in system operation flexibility, since aperiodic channel quality reporting is achievable for any downlink component carrier at the same time as suitable uplink component carriers can be selectively chosen for uplink transmission.

According to an embodiment of the invention, the jointly encoded information includes a number of bits defining a representation of a channel quality report request for each downlink component carrier of the set of downlink component carriers, and an indication of an uplink component carrier to be used for transmission of at least one channel thereby requested quality report. Also, the number of bits of the jointly encoded information may define an indication of an uplink component carrier, which uplink component carrier is to be used for normal data transmission.

According to another embodiment of the invention, the jointly encoded information includes a number of bits defining an indication of an uplink component carrier to be used for normal data transmission. Here, the jointly encoded information can represent at most a number of channel quality report requests being equal to a number of bits of that representation.

Generally, in LTE-Advanced, carrier aggregation is supported for up to five component carriers for both downlink and uplink. Thus, when the network node requests one DL component carrier's CQI/PMI/RI, i.e., by transmitting a positive CQI request to the UE, and also decides on one UL component carrier for transmitting such a requested CQI/PMI/RI, there will be at most 5*5=25 combinations of DL and UL component carriers for such requests and UL report transmission scheduling.

In addition, if there is no positive CQI request, it should be possible to schedule data on any of up to five UL component carriers, according to normal data transmission. In total, this gives at most 30 combinations (25 combinations of requests and UL report transmission scheduling plus five UL data transmission scheduling. According to this embodiment, a CQI/PMI/RI report is requested for each DL component carrier, and the UL component carrier used for UL transmission of the CQI/PMI/RI report is jointly encoded into one state.

According to an embodiment of the invention, the bits in the PDCCH being used for representing the information, i.e., the bits being used for encoding these states, include at least one CIF bit, and at least one CQI request bit. To use the CIF bits for representation is advantageous, since the CIF bits are already defined and present in the system, and do thus not add to system complexity and overhead.

According to another embodiment of the invention, the bits in the PDCCH being used for representing the information further include one or more additional bits, i.e., the bits include at least one CIF bit, at least one CQI request bit, and at least one additional bit.

As stated above, in 3GPP LTE, the payload sizes of Format 0 and 1A are matched to be of the same length by appending bits to the information fields in these formats. Thus, if the number of information bits in Format 0 is smaller than the number of information bits in Format 1A, zeros are padded in Format 0 until the total number of bits is the same in the information fields of Format 0 and Format 1A. According to an embodiment of the invention, the at least one additional bit being used by the joint encoding for representing the information includes at least one such padding bit.

By utilizing one or more padding bits for this purpose, the joint encoding can convey more information to the UE without increasing the overhead and complexity, since the padding one or more bits are already present and used in the system signaling. Thus, this embodiment makes use of a present but non-utilized signaling resource, which is very advantageous.

Thus, in the uplink grant PDCCH there are 3 CIF bits, and 1 CQI request bit. According to these embodiments, one or more new bits are introduced in the PDCCH, or one or more bits are reused in the PDCCH, and then joint encoding is performed utilizing these at least five bits. This joint encoding is utilized for indicating combinations of a CQI/PMI/RI request for each DL component carrier, and the UL component carriers to be used for transmitting the channel quality reports, respectively.

When these five bits are jointly encoded, there will be 32 ($2^5=32$) states, in which a first group of up to 25 states are used to indicate the DL/UL carrier combination as described above, and a second group of up to 5 states are used only for indicating which UL component carrier is for normal PUSCH transmission with a non-positive CQI request. Hence, there are 2 spare states, which could be used to request CQI/PMI/RI reports for more than one downlink component carrier.

Regarding the number of states to be assigned to the first and second groups, respectively, this depends on the carrier aggregation being used. The states in the first and second groups should be exclusive of each other.

Hence, from the jointly encoded information, the UE is able to determine, for each downlink component carrier, if the CQI request is positive or not, i.e., if the CQI bit is 0 or 1. Thereto, the UE is able to determine, for each UL component carrier if it should be used for transmission or not.

Thus, the joint encoding of the invention achieves an efficient encoding having low complexity. This joint encoding can be compared to the straightforward solution, which a skilled person would choose when starting from the prior art. This straightforward solution would be to add three or five additional bits in the uplink grant PDCCH, which is used to indicate one or more downlink component carriers for which CQI/PMI/RI report are requested. These additional bits are then only useful when the CQI request is enabled, otherwise they are not valid. Hence, this straightforward solution would result in overhead increase of the uplink grant PDCCH, and would result an uplink grant PDCCH having two different sizes corresponding to the cases of enabled and disabled CQI, respectively. The use of these differing sizes for the uplink grant increases the complexity of PDCCH blind detection. Accordingly, the joint encoding solution of the invention solves this complexity problem.

An example of this embodiment is given by Table 1, in which five DL (numbered as 0,1,2,3,4) and five UL component carriers (numbered as 0,1,2,3,4) are assumed to be used for carrier aggregation. The maximum number of CQI/PMI/RI report requests that can be conveyed by this joint encoding is equal to the number of downlink carriers. In this example representation, the notation $b_i$, i=0,1,2,3,4, denotes the CQI request on DL component carrier i (a '1' implies that a CQI is requested), and $c_i$ the transmission assignment on UL component carrier i (a '1' implies that it is used for transmission). One of the spare states has in this example been designated to request CQI/PMI/RI for multiple DL component carriers. The bits being transmitted in the downlink control channel representing the jointly encoded information are $<a_0\ a_1\ a_2\ a_3\ a_4>$.

Below, Table 1 is shown. Table 1 continues on the next page.

TABLE 1

| $<a_0\ a_1\ a_2\ a_3\ a_4>$ | CQI request $<b_0\ b_1\ b_2\ b_3\ b_4>$ | UL component carrier(s) used for transmission $<c_0\ c_1\ c_2\ c_3\ c_4>$ |
|---|---|---|
| <00000> | <10000> | <10000> |
| <00001> | <10000> | <01000> |
| <00010> | <10000> | <00100> |
| <00011> | <10000> | <00010> |
| <00100> | <10000> | <00001> |
| <00101> | <01000> | <10000> |
| <00110> | <01000> | <01000> |
| <00111> | <01000> | <00100> |
| <01000> | <01000> | <00010> |
| <01001> | <01000> | <00001> |
| <01010> | <00100> | <10000> |
| <01011> | <00100> | <01000> |
| <01100> | <00100> | <00100> |
| <01101> | <00100> | <00010> |
| <01110> | <00100> | <00001> |
| <01111> | <00010> | <10000> |
| <10000> | <00010> | <01000> |
| <10001> | <00010> | <00100> |
| <10010> | <00010> | <00010> |
| <10011> | <00010> | <00001> |
| <10100> | <00001> | <10000> |
| <10101> | <00001> | <01000> |
| <10110> | <00001> | <00100> |
| <10111> | <00001> | <00010> |
| <11000> | <00001> | <00001> |
| <11001> | <00000> | <10000> |
| <11010> | <00000> | <01000> |
| <11011> | <00000> | <00100> |
| <11100> | <00000> | <00010> |
| <11101> | <00000> | <00001> |
| <11110> | <11111> CQI/PMI/RI of all the DL component carriers is requested | <10000> (assuming primary carrier) |
| <11111> | reserved | reserved |

Furthermore, it is possible to increase the number of spare states by assuming certain restrictions regarding which UL component carrier that is used for transmission. For example, if it is assumed that the CQI/PMI/RI report for the DL PCC is always transmitted on the UL PCC, 4 states out of the first group of 25 states could be denoted as spare states.

A person skilled in the art can also generalize the joint encoding principle described here to other number of bits and aggregated number of component carriers. For example, the joint encoding can use 4 bits in the PDCCH, e.g., 3 CIF bits and 1 CQI request bit, whereby it is possible to support CQI/PMI/RI requests for 3 component carriers to be transmitted on any of 3 UL component carriers (3*3 bits for positive CQI request, 3 bits for non-positive CQI request, and 4 spare bits), or CQI/PMI/RI requests for 4 component carriers to be transmitted on any of 3 UL component carriers (4*3 bits for positive CQI request, and 4 bits for non-positive CQI request), or CQI/PMI/RI requests for 5 component carriers to be transmitted on any of 2 UL component carriers (5*2 bits for positive CQI request, 5 bits for non-positive CQI request, 1 spare state) etc.

The joint encoding of CQI/PMI/RI request and UL component carrier used for transmission could be differently configured on different DL component carriers. That is, a bit combination $<a_0\ a_1\ a_2\ a_3\ a_4\ a_5>$ may have different interpretation depending on which DL component carrier the PDCCH was transmitted on.

In the prior art 3GPP LTE system, each downlink carrier being used for unicast transmission is associated with an UL carrier, i.e., each DL carrier is (in FDD) paired with an UL carrier. The aperiodic report is in the prior art solution always transmitted in the paired UL carrier, which may not be the optimal UL carrier for this transmission.

This problem is solved by an embodiment of the invention, wherein at least one uplink component carrier is identified based on the information provided by the downlink control channel. This identified uplink component carrier is then used for uplink transmission of the at least one channel quality report being requested. Thus, the uplink shared channel (e.g., PUSCH) used for transmitting the requested aperiodic CQI/PMI/RI report is given in the control channel. Thereby the uplink transmission can be optimized in relation to the system.

According to an embodiment of the invention, the one or more channel quality reports are transmitted on at least one uplink component carrier being uniquely identified based on Carrier Indicator Field (CIF) bits of the downlink control channel. Thus, the report is transmitted in the PUSCH resources being assigned by the PDCCH that contained the CQI request, on the UL component carrier defined by its CIF bits. The transmission may also include data if there is also an UL grant.

According to an embodiment of the invention, the one or more channel quality reports are transmitted on one uplink component carrier being a Primary Component Carrier (PCC) for the carrier aggregation.

According to an embodiment of the invention, the one or more channel quality reports are transmitted on one uplink component carrier being associated with one downlink component carrier of the set of downlink component carriers.

According to an embodiment of the invention, the one or more channel quality reports are transmitted on one uplink component carrier being identified by use of CIF bits of the downlink control channel, where the uplink component carrier is scheduled for transmission of data. Thus, if there is a positive CQI request and the downlink control channel, i.e., PDCCH, also includes an UL grant, i.e., schedules UL data, UL resources (including component carrier) for the PUSCH are assigned according the CIF bits while the aperiodic CQI/PMI/RI is reported for the DL component carrier determined from an interpretation of the same CIF bits.

According to an embodiment of the invention, the one or more channel quality reports are transmitted on one uplink component carrier being associated with one downlink component carrier of the set of downlink component carriers, where that one downlink component carrier is used for transmission of the downlink control channel. Thus, if there is a positive CQI request only, i.e., there is no concurrent UL grant for data, or if there is a positive CQI request and concurrent UL grant for data, the UL component carrier for the PUSCH in which the aperiodic CQI/PMI/RI report should be transmitted, can be predefined (e.g., the UL component carrier being linked/associated to the downlink component carrier on which the PDCCH was transmitted), and not be determined according to the CIF bits. The time-frequency resources, i.e., resource blocks, for the PUSCH in which the aperiodic report is to be transmitted are still determined by the grant in the PDCCH, with the exception of the CIF bits.

Figure 2:
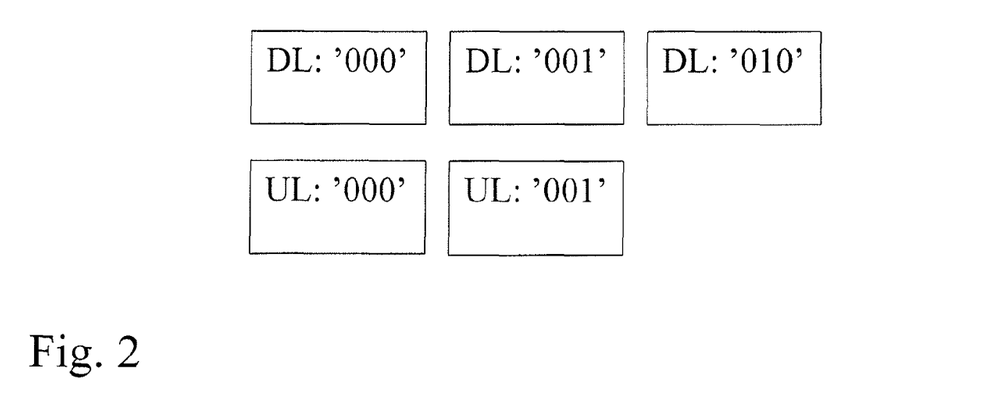
FIG. 2 shows an example of a downlink and uplink component carrier configuration.

FIG. 2 shows one example where three downlink component carriers (numbered as '000', '001' and '010') and two uplink component carriers (numbered as '000' and '001') are used for carrier aggregation, while the DL component carrier '010' has no corresponding UL component carrier. In this case, a predetermined rule could be to always transmit the aperiodic report for DL carrier '010' in a predefined UL component carrier, e.g., '000', or in the UL component carrier paired with the DL component carrier that contained the PDCCH. For example, a PDCCH scheduled in DL component carrier '001' with positive CQI request, having CIF bits '010', would transmit the aperiodic CQI/PMI/RI report of DL component carrier '010' in UL component carrier '001' on the resources given by the PDCCH.

As stated above, according to an embodiment of the invention, a predefined rule stipulates that if there is a positive CQI request, CIF bits are only used for pointing out the DL component carrier for which CQI/PMI/RI should be reported. CIF bits are thus not be used for UL grants, i.e., cross-carrier scheduling of data on PUSCH is not used if CQI request is positive, and the PUSCH must be transmitted on an UL component carrier being paired with the DL component carrier on which the PDCCH was transmitted. This embodiment allows transmission of both an aperiodic CQI/PMI/RI report and UL data simultaneously and is beneficial when the enumeration differ among the paired UL and DL component carriers.

This is illustrated for example in FIG. 2, wherein a PDCCH with CIF bits '010' being transmitted in DL component carrier '000' or '001', respectively, aperiodic CQI/PMI/RI should be reported for DL component carrier '010', while the PUSCH is transmitted (including the aperiodic CQI/PMI/RI report) in UL component carrier '000' or '001', respectively. Hence, for a positive CQI request, cross-carrier scheduling is not performed for the PUSCH, although the PDCCH contains CIF bits.

In the above embodiments, the at least one uplink component carrier can include a Physical Uplink shared Channel (PUSCH) of an LTE-Advanced system.

Further, according to an embodiment of the invention, the location itself of the downlink control channel in a downlink component carrier is used for carrying information. Thus, the specific location of the downlink control channel can by the UE be utilized for identifying the at least one identified downlink component carrier, for which a channel quality request shall be provided. This embodiment can be used in combination with essentially any other embodiment of the invention, such that the information provided by the specific location of the downlink control channel in the downlink component carrier is utilized by the UE, together with information conveyed, e.g., by CIF bits, and/or by the choice of downlink component carrier, e.g., PCC or SCC, in which the downlink control channel was transmitted.

The downlink control channel can here be located in either of the common search space and the UE specific search space of the downlink component carrier.

According to an embodiment of the invention, when the downlink control channel is located in a common search space of the downlink component carrier, this location indicates a first subset of downlink component carriers, for which a channel quality report is to be provided.

According to another embodiment of the invention, when the downlink control channel is located in a UE specific search space of the downlink component carrier, this location indicates a second subset of downlink component carriers, for which a channel quality report is to be provided, wherein the first and second subsets may be disjoint.

To utilize this location of the control channel for conveying information is of course very efficient regarding transmission resources, since no additional bits are transmitted.

According to an embodiment, if the downlink control channel is located in a common search space of the downlink component carrier, this shall indicate, and by the UE be interpreted as, a request for channel quality reports for all downlink component carriers of the set of downlink component carriers.

According to another embodiment, if the downlink control channel is instead located in a UE specific search space of the downlink component carrier, this shall indicate, and by the UE be interpreted as, a request for channel quality report for a subset of all downlink component carriers of the set of downlink component carriers.

Thus, the UE is here arranged for determining in which search space of a downlink component carrier the downlink control channel is located, and is also arranged for determining, based on this determined location of the control channel, for which downlink component carriers a channel quality report is to be provided to the network node.

Generally, regarding the above embodiments, the different steps of the method of the invention described above can be combined or performed in any suitable order. A condition for this of course, is that the requirements of a step, to be used in conjunction with another step of the method of the invention, are fulfilled.

Also, the method of the invention can be implemented by a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Further, the invention is implemented in a network node of a radio communication system, e.g., a LTE-Advanced system, which utilizes carrier aggregation. The network node is arranged for obtaining of aperiodic downlink channel quality reporting in cooperation with a UE in the system.

Figure 3:
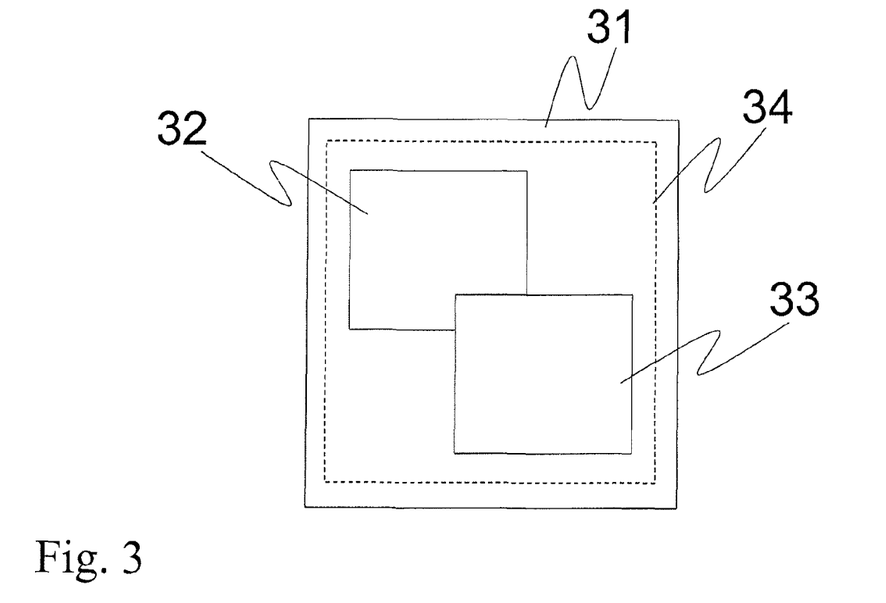
FIG. 3 illustrates an example network node in accordance with the invention.

FIG. 3 illustrates an example network node (31) in accordance with the invention. The network node comprises, in addition to the entities of a prior art network node, a set determination entity (32). This set determining entity is arranged for determining a set of downlink component carriers from a number of downlink component carriers being usable for downlink carrier aggregation in the system. The network node also comprises a downlink control channel providing entity (33), which is arranged for providing a downlink control channel for the cooperating UE. The downlink control channel is here arranged to include information being usable for identifying at least one downlink component carrier of the set of downlink component carriers for which a channel quality report is to be provided. The set determination entity (32) and the downlink control channel providing entity (33) optionally shares processing circuitry (34).

Thus, a network node working in accordance with the invention, is arranged for providing the UE with all the different types of information being specified above for each one of the embodiments of the invention. The downlink control channel providing entity is arranged for having this information being included in the downlink control channel. For example, this downlink control channel providing entity information is arranged to include this information in a form utilizing the CIF bits or in a form not utilizing the CIF bits, in a form representing joint encoding, etc.

For example, the downlink control channel providing entity of the network node is arranged for providing information needed by the UE for providing channel quality reports to the network node. This information includes information identifying the downlink component carriers for which a channel quality report is to be provided and/or uplink transmission resources to be used for transmitting these channel quality reports or normal data transmission.

Further, the invention is implemented in a UE of the radio communication system utilizing carrier aggregation. The UE is arranged for obtaining of aperiodic downlink channel quality reporting in cooperation with a network node in the system.

Figure 4:
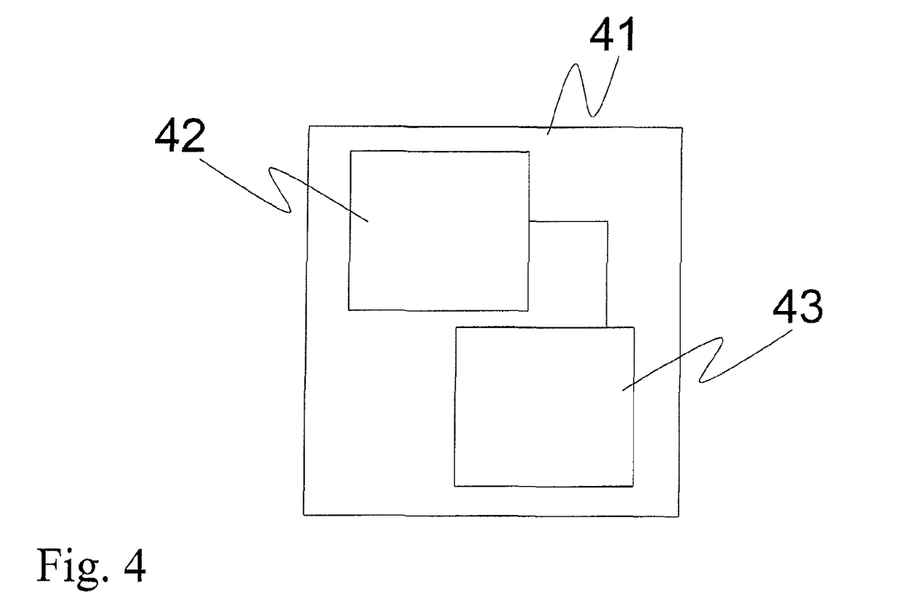
FIG. 4 illustrates example user equipment in accordance with the invention.

FIG. 4 illustrates example user equipment in accordance with the invention. The illustrated UE (41) includes a channel quality reporting entity (42), which is arranged for providing a channel quality report for each one of the one or more identified downlink component carriers. The channel quality reporting entity is preferably arranged for identifying these one or more identified downlink component carriers from a set of downlink component carriers by utilizing information being included in a downlink control channel for the UE. This downlink control channel is transmitted to the UE from the cooperating network node.

Thus, a UE working in accordance with the invention is, by utilizing the channel quality reporting entity (42), arranged for detecting information provided by the network node on the downlink control channel. The channel quality reporting entity is further arranged for establishing communication for transmission, possibly in accordance with uplink transmission resource information included with the information from the network node, of the information to the network node from a transmitter (43) of the UE.

The UE is arranged for detecting all types of information being provided by the network node in accordance with the above described embodiments of the invention. The UE is arranged for utilizing all of these types of information for identifying downlink component carriers, for which channel quality reports are wanted, and identifying uplink transmission resources to be used for uplink transmission of these channel quality reports and/or normal data transmission.

The network node and the UE, respectively, of the invention may be adapted to processing in accordance with the invention at least to the extent that such processing involves either of a network node or UE. Thus, embodiments of respective network node and UE of the invention preferably comprise circuitry for performing any portion of a method in accordance with the invention provided such a portion involves the network node or UE.

The aperiodic downlink channel quality reporting according to the invention may be modified by those skilled in the art, as compared to the exemplary embodiments described above.

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

What is claimed is:

1. A method performed by a network node in a radio communication system to obtain aperiodic downlink channel quality reporting from a User Equipment apparatus (UE), wherein the UE is set up to communicate with the network node utilizing a plurality of downlink component carriers and a plurality of uplink component carriers, the method comprising:
   signaling, in a downlink control channel to the UE, first information and second information, wherein the first information identifies an uplink component carrier selected from the plurality of uplink component carriers and is used for selecting a downlink component carrier from the plurality of downlink component carriers for the UE to generate a channel quality report, wherein the selecting is based on an association of the selected downlink component carrier with the uplink component carrier identified by the first information, and wherein the second information includes a positive channel quality report request; and
   receiving from the UE the channel quality report for the selected downlink component carrier associated with the uplink component carrier identified by the first information.

2. The method according to claim 1, wherein the downlink component carriers is a Primary Component Carrier (PCC).

3. The method according to claim 1, wherein the positive channel quality report request is included in a downlink control channel of a Primary Component Carrier (PCC).

4. The method according to claim 3, wherein the downlink control channel is transmitted in a common search space of the PCC.

5. The method according to claim 1, wherein the positive channel quality report request is included in a downlink control channel of a Secondary Component Carrier (SCC).

6. A network node of a radio communication system comprising:
   a transmitter;
   a receiver; and
   a processor,
   wherein the processor is configured to:
   set up communication channels with a User Equipment device (UE), wherein the UE communicates with the network node via a plurality of uplink component carriers and a plurality of downlink component carriers;
   transmit, using the transmitter in a downlink control channel to the UE, signaling data including first information and second information, wherein the first information identifies an uplink component carrier selected from the plurality of uplink component carriers and is used for selecting a downlink component carrier from the plurality of downlink component carriers for the UE to generate a channel quality report, wherein the selecting is based on an association of the selected downlink component carrier with the uplink component carrier identified by the first information, and wherein the second information includes a positive channel quality report request; and
   receive, via the receiver from the UE, the channel quality report for the selected downlink component carrier associated with the uplink component carrier identified by the first information.

7. A user equipment apparatus (UE) of a radio communication system comprising:
   a transmitter;
   a receiver; and
   a processor,
   wherein the processor is configured to:
   set up communication channels with the network node, wherein the communication channels include a plurality of uplink component carriers and a plurality of downlink component carriers;
   receive, via the receiver in a downlink control channel from the network node, signaling data including first information and second information, wherein the first information identifies an uplink component carrier selected from the plurality of uplink component carriers, and the second information includes a positive channel quality report request;
   select a downlink component carrier from the plurality of downlink component carriers based on an association of the selected downlink component carrier with the uplink component carrier identified by the first information;
   generate a channel quality report for the selected downlink component carrier; and
   transmit, using the transmitter, to the network node the channel quality report for the selected downlink component carrier.

8. The UE according to claim 7, wherein the processor is further configured to use the transmitter to transmit to the network node, the channel quality report for the selected downlink component carrier via the uplink component carrier identified by the first information.

9. The UE according to claim 7, wherein the UE is a UE of an LTE-Advanced system and the uplink component carrier includes a Physical Uplink shared Channel (PUSCH) of the LTE-Advanced system and said downlink control channel is a Physical Downlink Control Channel (PDCCH) of the LTE-Advanced system.

10. The method according to claim 1, wherein the radio communication system is an LTE-Advanced system and the uplink component carrier includes a Physical Uplink shared Channel (PUSCH) of the LTE-Advanced system and said downlink control channel is a Physical Downlink Control Channel (PDCCH) of the LTE-Advanced system.

11. The network node according to claim 6, wherein the processor is further configured to use the receiver to receive, from the UE, the channel quality report for the selected downlink component carrier via the uplink component carrier identified by the first information.

12. The network node according to claim 6, wherein the network node is a network node of an LTE-Advanced system and the uplink component carrier includes a Physical Uplink shared Channel (PUSCH) of the LTE-Advanced system and said downlink control channel is a Physical Downlink Control Channel (PDCCH) of the LTE-Advanced system.

* * * * *